(12) United States Patent
Verma et al.

(10) Patent No.: US 11,296,771 B2
(45) Date of Patent: Apr. 5, 2022

(54) BASE STATION BEAM MANAGEMENT BASED ON TERMINAL TRANSMIT DATA INDICATION

(71) Applicant: International Business Machines Corporation, Armonk, NY (US)

(72) Inventors: Dinesh C. Verma, New Castle, NY (US); Ramya Raghavendra, New York, NY (US); Bong Jun Ko, Harrington Park, NJ (US); Mudhakar Srivatsa, White Plains, NY (US); Nirmit V. Desai, Yorktown Heights, NY (US); Raghu Kiran Ganti, White Plains, NY (US); Shiqiang Wang, White Plains, NY (US); Supriyo Chakraborty, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 173 days.

(21) Appl. No.: 16/811,309

(22) Filed: Mar. 6, 2020

(65) Prior Publication Data

US 2021/0281309 A1  Sep. 9, 2021

(51) Int. Cl.
| | |
|---|---|
| *H04B 7/06* | (2006.01) |
| *H04W 72/04* | (2009.01) |
| *H04W 16/28* | (2009.01) |
| *H04B 7/08* | (2006.01) |

(52) U.S. Cl.
CPC ........... *H04B 7/0695* (2013.01); *H04B 7/088* (2013.01); *H04W 16/28* (2013.01); *H04W 72/046* (2013.01)

(58) Field of Classification Search
CPC .... H04B 7/0695; H04B 7/088; H04B 7/0623; H04B 7/063; H04W 16/28; H04W 72/046
See application file for complete search history.

(56) References Cited

U.S. PATENT DOCUMENTS

| | | |
|---|---|---|
| 9,961,664 B2 | 5/2018 | Chandwani et al. |
| 10,200,882 B1 | 2/2019 | Nelapati et al. |
| 10,205,504 B2 | 2/2019 | Nammi et al. |
| 2016/0173322 A1* | 6/2016 | Purpura ................ H04B 10/80 370/216 |
| 2017/0041811 A1* | 2/2017 | Qiao ....................... H04L 5/14 |
| 2017/0212208 A1 | 7/2017 | Baek et al. |

(Continued)

*Primary Examiner* — Kiet Tang
(74) *Attorney, Agent, or Firm* — Cantor Colburn LLP; Joseph Petrokaitis (57) ABSTRACT

Aspects of the invention include methods of performing beam management in a base station of a cellular network. A method includes obtaining, at the base station, information indicating whether one or more terminals of the cellular network have data to transmit, and determining, using the base station, during a sweep by the base station if an upcoming terminal has data to transmit based on the information. The sweep by the base station is a sequential movement of the beam over a coverage area. The method also includes foregoing, by the base station, any communication with the upcoming terminal during the sweep based on the information indicating that the upcoming terminal has no data to transmit, and communicating, using the base station, with the upcoming terminal during the sweep based on the information indicating that the upcoming terminal has data to transmit.

20 Claims, 4 Drawing Sheets

(56) References Cited

U.S. PATENT DOCUMENTS

| | | |
|---|---|---|
| 2017/0311307 A1 | 10/2017 | Negus et al. |
| 2018/0069606 A1 | 3/2018 | Jung et al. |
| 2018/0115305 A1* | 4/2018 | Islam .................. H04B 7/0417 |
| 2019/0053296 A1 | 2/2019 | Balappanavar et al. |
| 2019/0386728 A1* | 12/2019 | Yoshimura ............ H04L 5/0023 |
| 2020/0383088 A1* | 12/2020 | Min ...................... H04W 72/02 |

* cited by examiner

BASE STATION BEAM MANAGEMENT BASED ON TERMINAL TRANSMIT DATA INDICATION

BACKGROUND

The present invention generally relates to cellular networks and, more specifically, to base station beam management based on terminal transmit data indication.

Cellular networks are used for a number of communication applications. For example, a fifth generation long term evolution (5G LTE) cellular network uses millimeter wave technology operating between 30 and 300 gigahertz (GHz). The higher frequency range relative to prior cellular technologies results in higher bandwidth and lower latency. Due to the relatively higher frequency range, 5G also results in reduced range and the requirement for line-of-sight between a base station (i.e., cellular tower) and terminal. The base station uses sweeping beams to connect with terminals in its line of sight. Generally, a sweep, in the present context, refers to sequential movement of the beam over an area (e.g., an area that is 360 degrees around and base station). The terminals can be stationary or mobile.

SUMMARY

Embodiments of the present invention are directed to base station beam management based on terminal transmit data indication. A non-limiting example method includes a method of performing beam management in a base station of a cellular network. The method includes obtaining, at the base station, information indicating whether one or more terminals of the cellular network have data to transmit, and determining, using the base station, during a sweep by the base station if an upcoming terminal has data to transmit based on the information. The sweep by the base station is a sequential movement of the beam over a coverage area. The method also includes foregoing, by the base station, any communication with the upcoming terminal during the sweep based on the information indicating that the upcoming terminal has no data to transmit, and communicating, using the base station, with the upcoming terminal during the sweep based on the information indicating that the upcoming terminal has data to transmit.

Other embodiments of the present invention implement features of the above-described method in a system.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As previously noted, a 5G cellular network uses millimeter wave technology that requires line of sight between the base station and a 5G terminal. Exemplary terminals include data terminals (i.e., micro base stations) that can be stationary (e.g., at a street corner or on the roof of a building) or mobile (e.g., on the roof of a vehicle), as well as within smart phones, tablets, and other cellular devices. According to prior approaches, a base station implementing 5G technology uses a sweeping beam to connect with line of sight terminals. During each sweep, the base station interrogates each terminal to determine if the terminal has any data to transmit. If the terminal has data to transmit, a data exchange is performed. If the terminal does not have data to transmit, the base station simply continues the sweep.

One or more embodiments of the present invention provide base station beam management based on terminal transmit data indication. The transmit data indication used by each terminal provides efficiency and time savings over the prior sweep and interrogate approach. Specifically, each terminal can provide an indication of whether it has data to transmit or has no data to transmit. As such, the base station need not check for data at each terminal encountered during a sweep. Detailed herein are different types of indications used by the terminals and, correspondingly, different types of detectors used by the base station to determine the indication. Also detailed are different exemplary embodiments for managing the base station sweep according to the indications.

Figure 1:
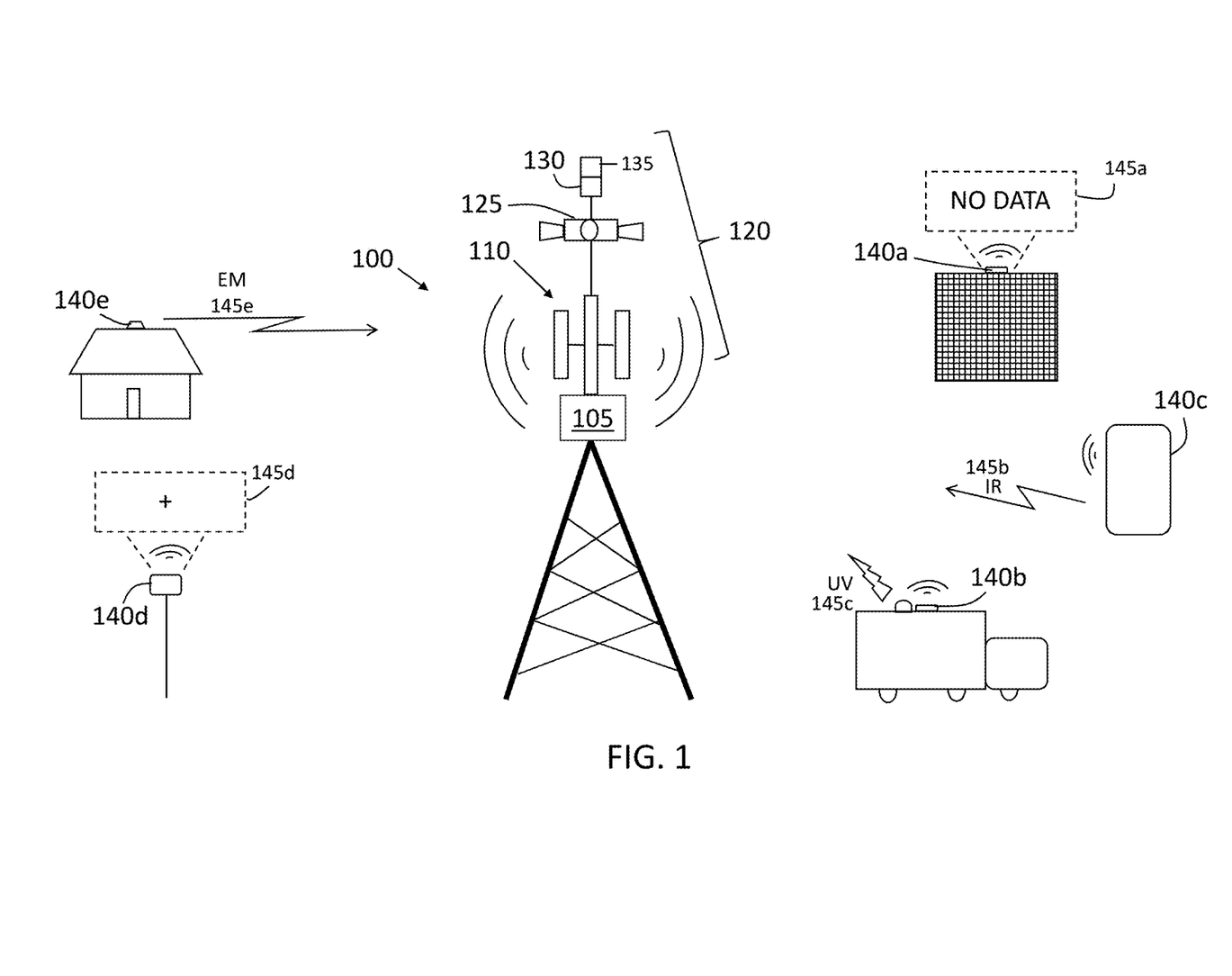
FIG. 1 depicts a base station that implements beam management based on terminal transmit data indication according to one or more embodiments of the invention.

Turning now to FIG. 1, a 5G base station 100 that implements beam management based on terminal transmit data indication according to one or more embodiments of the invention is shown. The base station 100 includes processing circuitry 105 (e.g., processor, memory devices) and antennas 110 to perform cellular communication and can be referred to as a macro base station. As previously noted, the base station 100 requires line of sight for communication. This is because 5G technology uses high frequencies (i.e., greater than 24 gigahertz (GHz)) corresponding with millimeter wavelengths (mmWave) that are unable to penetrate obstacles (e.g., buildings). The typical range of the base station 100 is on the order of 500 feet (ft) to 3000 ft.

Exemplary terminals 140a, 140b, 140c, 140d, and 140e (generally referred to as 140) that the base station 100 communicates with are also shown. The terminals 140a, 140d, and 140e are all small cellular base stations and can be of different types according to their range (e.g., microcell, pico cell, and femto cell from highest to lowest range). The exemplary terminal 140a is a microcell located on the roof of a building, for example, with line of sight to the base station 100. The microcell facilitates access to the 5G network for terminals 140 (e.g., computers, smart phones) within the building. Similarly, the terminal 140d can be a pico cell positioned at a street corner, for example, to provide access to the 5G network for terminals 140 (e.g., vehicles, hand-held devices of pedestrians) in its vicinity. The terminal 140e can be a femto cell on a house. While the terminals 140a, 140d, and 140e are stationary, the terminal 140b is on a truck and, thus, is mobile. The terminal 140c is a smart phone and is also mobile. The exemplary terminals 140 shown in FIG. 1 are not intended to limit the types of devices that can communicate over the 5G network.

According to one or more embodiments of the invention, the terminals 140 provide an indicator 145a, 145b, 145c, 145d, 140e (generally referred to as 145) regarding data for transmission to the base station 100. The indicator 145 precludes the interrogation of each terminal 140 by the base station 100 as previously required. The terminals 140a and 140d are shown with respective exemplary indicators 145a and 145d that are visual indicators. In the case of the terminal 140a, the indicator 145a is text, and the exemplary text indicates "no data" or that the terminal 140a has not data to transmit to the base station 100. In the case of the terminal 140d, the indicator 145d is a symbol, and the exemplary symbol indicates that the terminal 140d does have data to transmit to the base station 100. These two indicators 145a and 145d represent two exemplary embodiments of the invention. That is, the indicator 145 (e.g., indicator 145a) can indicate which terminals 140 can be skipped by the base station 100 (i.e., which terminals 140 have not data to transmit) or, according to an alternate embodiment, the indicator (e.g., indicator 145d) can indicate which terminals 140 are the only ones with which the base station 100 need communicate (i.e., which terminals 140 have data to transmit).

The terminals 140b and 140c are shown with respective exemplary indicators 145b and 145c that emit optical signals. The indicator 145b emits in the ultraviolet (UV) band, and the indicator 145c emits in the infrared (IR) band according to the exemplary embodiments shown in FIG. 1. The base station 100 is shown to include detectors 120, co-located with the base station 100, for the different indicators 145. According to alternate embodiments, the detectors 120 can be located separately from the base station 100 but with line of sight to the terminals 140 serviced by the base station 100. The exemplary detectors 120 include a camera 125, an IR receiver 130, a UV receiver 135, and the antennas 110 of the base station 100. The camera 125 can be a multi-directional camera, as shown, and have a range of over 5000 ft, for example. The location of stationary terminals 140 such as terminal 140a, 140d, and 140e is known. Thus, image processing of images obtained by the camera 125 at the known locations allows a determination of what each indicator 145 is indicating.

The optical signals transmitted by the indicators 145b and 145c can be coded. As such, the IR receiver 130 and the UV receiver 135 can include processing circuitry or provide received signals to the processing circuitry 105 to decode the optical signals. The terminal 140e includes an indicator 145e that emits an electromagnetic (EM) signal. The EM signal emitted by the indicator 145e can be at a different frequency than the frequency used for data transfer from a terminal 140 to the base station 100 (e.g., 85 GHz for the indicator 145e and 80 GHz for data transfer) and can be received using the antennas 110 of the base station 100 as the detector 120 (i.e., a different channel of the base station 100 than the channel used for communication with the terminals 140). The exemplary indicators 145 are not intended to limit the indications that can improve base station beam management by eliminating the need for interrogation of each terminal 140.

Figure 2:
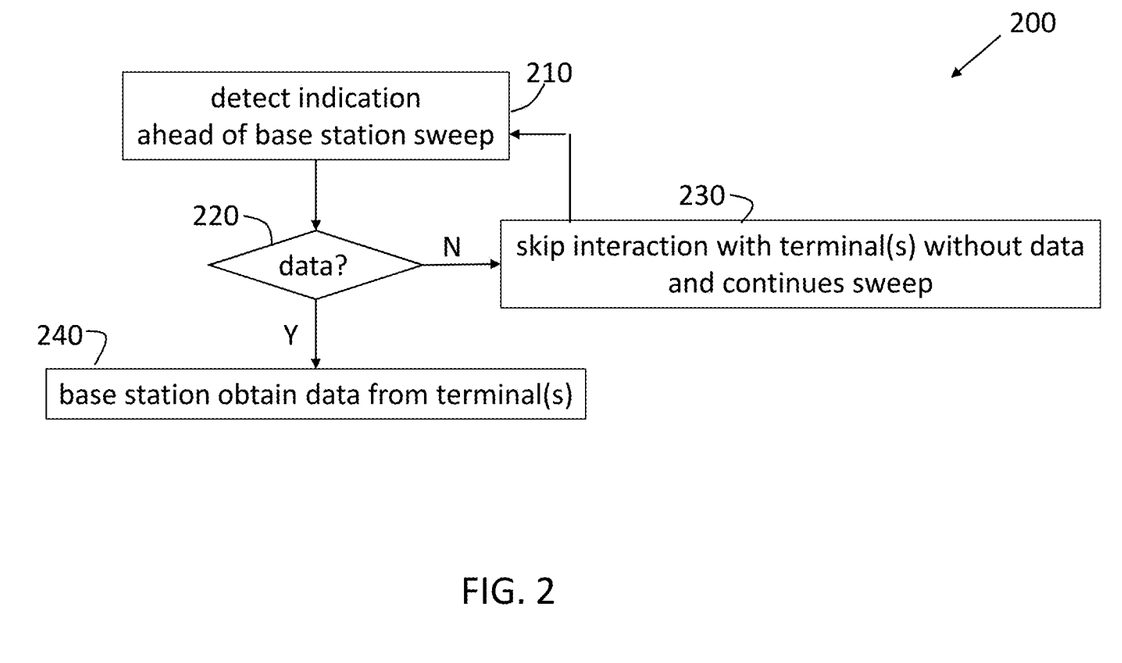
FIG. 2 is a process flow of a method of performing base station beam management in accordance with one or more exemplary embodiments of the present invention.
Figure 3:
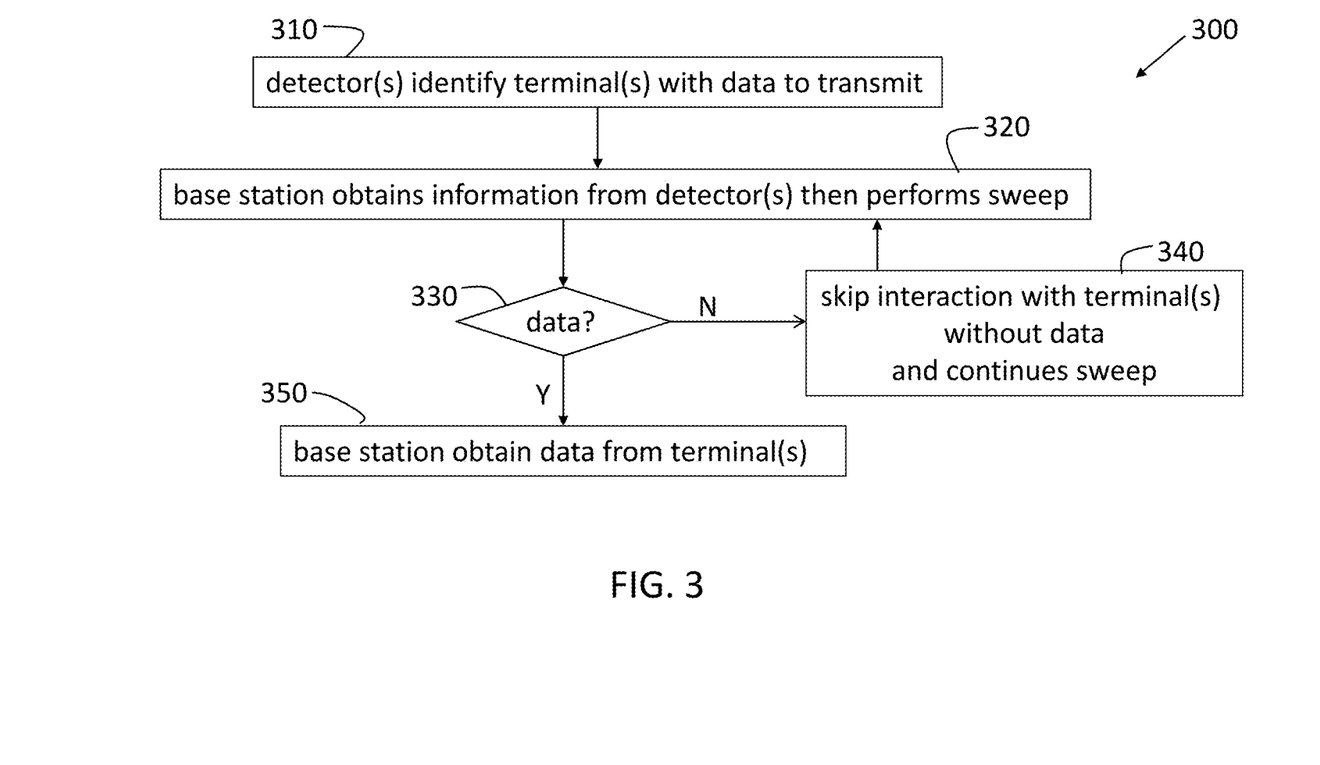
FIG. 3 is a process flow of a method of performing base station beam management in accordance with one or more exemplary embodiments of the present invention.

According to an exemplary embodiment of the invention, only one type of indicator 145 can be used by every terminal 140 such that the base station 100 only includes one type of detector 120 (e.g., camera 125, IR receiver 130, UV receiver 135). According to alternate embodiments of the invention, different types of indicators 145 can be used by different terminals 140, as in the example shown in FIG. 1. In this case, the base station 100 can include different types of detectors 120 as in the exemplary case shown in FIG. 1. FIGS. 2 and 3 detail exemplary base station beam management schemes.

As previously noted, prior management of the base station 100 involved interrogating each terminal 140 within the line of sight and range of the base station 100 in turn. The base station 100 implemented a scan and queried each terminal 140 encountered during the scan to determine whether the terminal 140 had data to transmit to the base station 100. If only twenty percent of the queried terminals 140 had data to transmit for 32 slots on average, with the average data transmission rate being 32 times that of the scan time, being able to cut the interrogation time for terminals 140 that do not have data for transmission results in a sixteen percent improvement in throughput. The lower the percentage of terminals 140 that have data for transmission, the higher the throughput improvement that is achieved through the management according to one or more embodiments of the invention.

FIG. 2 is a process flow of a method 200 of performing base station beam management in accordance with one or more exemplary embodiments of the present invention. According to the process flow shown in FIG. 2, a sweep by one or more detectors 120 (e.g., camera 125, IR receiver 130, UV receiver 135, different channel of base station 100) is trailed by a sweep by the base station 100. The lag between the sweep by the one or more detectors 120 and the sweep by the base station 100 can be selected to ensure that the one or more detectors 120 determine which terminals 140 have data and communicate that information to the base station 100 prior to the base station 100 reaching the terminals 140. Thus, at block 210, the method 200 includes detecting indications 145 ahead of the base station 100 sweep. For each terminal 140 that the base station 100 encounters in its (delayed) sweep, the base station 100 determines, at block 220, if the terminal 140 has data to transmit. This determination is based on the information provided by the (advanced) sweep of the one or more detectors 120.

If, at block 220, the base station 100 determines that the upcoming terminal 140 in the sweep does not have data according to the information provided by the one or more detectors 120, then the base station 100 skips any interaction with the terminal 140 and continues the sweep, at block 230. On the other hand, at block 220, the base station 100 can determine that the upcoming terminal 140 in its sweep has data to transmit according to information from the one or more detectors 120. Then, at block 240, the base station 100 engages with the terminal 140 and obtains the data. The base station 100 is not limited in the order in which it accesses upcoming terminals 140 that have data to obtain the data. By foregoing interaction with terminals 140 that do not have data to transmit, the sweep time of the base station 100 is reduced.

FIG. 3 is a process flow of a method 300 of performing base station beam management in accordance with one or more exemplary embodiments of the invention. According to the process flow shown in FIG. 3, one or more detectors 120 and the base station 100 do not perform a sweep together in a time-lagged manner. Instead, the base station 100 is provided with information about which terminals 140 have data to transmit prior to initiating its sweep. At block 310, the one or more detectors 120 (e.g., camera 125, IR receiver 130, UV receiver 135, different channel of base station 100) identify which terminals 140 have data to transmit. Based on which detectors 120 are used, the processes at block 310 can be instantaneous or near-instantaneous. For example, if the detector 120 is the multi-directional camera 125, images covering 360 degrees around the camera 125 and base station 100 can be obtained at once, and visual indicators 145 can be identified via image processing to determine which terminals 140 have data to transmit. As previously noted, the indicators 145 can provide a positive indication (i.e., the terminal 140 has data to transmit) or a negative indication (i.e., the terminal 140 does not have data to transmit) according to alternate embodiments of the invention.

At block 320, the base station 100 obtains information about which terminals 140 have data to transmit from the one or more detectors 120 and then performs a sweep. For each upcoming terminal 140 in the sweep, the base station 100 determines, at block 330, if the terminal 140 has data to transmit based on the information from the one or more detectors 120. If, at block 330, the base station 100 determines that the upcoming terminal 140 in the sweep does not have data according to the information provided by the one or more detectors 120, then the base station 100 skips any interaction with the terminal 140 and continues the sweep, at block 340. On the other hand, at block 330, the base station 100 can determine that the upcoming terminal 140 in its sweep has data to transmit according to information from the one or more detectors 120. Then, at block 350, the base station 100 engages with the terminal 140 and obtains the data. As noted with reference to the flow shown in FIG. 2, by foregoing interaction with terminals 140 that do not have data to transmit, the sweep time of the base station 100 is reduced.

Figure 4:
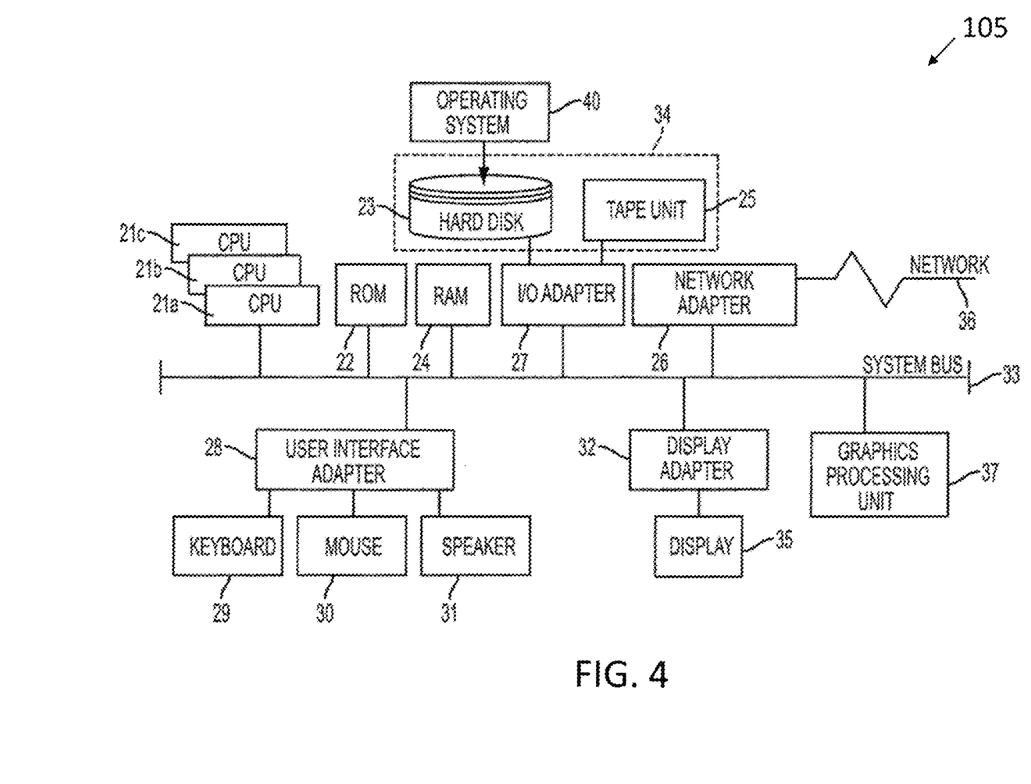
FIG. 4 is a block diagram of a processing system to implement base station beam management according to one or more embodiments of the invention.

FIG. 4 is a block diagram of the processing system 105 obtain information from detectors 120 and perform base station 100 beam management according to embodiments of the invention. The processing system 105 has one or more central processing units (processors) 21*a*, 21*b*, 21*c*, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 110.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 110 can be stored in mass storage 34. The RAM 22, ROM 24, and mass storage 34 are examples of memory 19 of the processing system 105. A network adapter 26 interconnects system bus 33 with an outside network 36 enabling the processing system 110 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 105 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 110 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 105.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method of performing beam management in a base station of a cellular network, the method comprising:
    obtaining, at the base station, information indicating whether one or more terminals of the cellular network have data to transmit;
    determining, using the base station, during a sweep by the base station if an upcoming terminal has data to transmit based on the information, wherein the sweep by the base station is a sequential movement of the beam over a coverage area;
    foregoing, by the base station, any communication with the upcoming terminal during the sweep based on the information indicating that the upcoming terminal has no data to transmit; and
    communicating, using the base station, with the upcoming terminal during the sweep based on the information indicating that the upcoming terminal has data to transmit.

2. The method according to claim 1, wherein the obtaining the information is from one or more detectors co-located with the base station.

3. The method according to claim 2, wherein the obtaining the information is based on one or more types of indicators at each terminal detected by the one or more detectors.

4. The method according to claim 3, wherein the one or more types of indicators include a visual indicator, an infrared signal, an ultraviolet signal, or an electromagnetic signal.

5. The method according to claim 3, wherein the one or more detectors include a camera, an infrared detector, an ultraviolet detector, or a channel of the base station that is different than a channel used for communication with terminals.

6. The method according to claim 2, wherein the obtaining the information is during the sweep by the base station based on the one or more detectors performing a detector sweep such that the sweep by the base station being time-lagged from the detector sweep.

7. The method according to claim 2, wherein the obtaining the information is prior to initiating the sweep by the base station.

8. A method of managing a base station of a cellular network, the method comprising:
- one or more detectors obtaining information indicating whether one or more terminals of the cellular network have data to transmit;
- the base station determining, during a sweep, if an upcoming terminal has data to transmit based on the information, wherein the sweep by the base station is a sequential movement of a beam of the base station over a coverage area;
- the base station foregoing any communication with the upcoming terminal during the sweep based on the information indicating that the upcoming terminal has no data to transmit; and
- the base station communicating with the upcoming terminal during the sweep based on the information indicating that the upcoming terminal has data to transmit.

9. The method according to claim 8, wherein the one or more detectors obtaining the information is based on one or more types of indicators detected by the one or more detectors.

10. The method according to claim 9, wherein the one or more types of indicators include a visual indicator, an infrared signal, an ultraviolet signal, or an electromagnetic signal.

11. The method according to claim 9, wherein the one or more detectors include a camera, an infrared detector, an ultraviolet detector, or a channel of the base station that is different than a channel used for communication with terminals.

12. The method according to claim 8, further comprising the base station obtaining the information from the one or detectors during the sweep by the base station based on the one or more detectors performing a detector sweep such that the sweep by the base station being time-lagged from the detector sweep.

13. The method according to claim 8, further comprising the base station obtaining the information from the one or more detectors prior to initiating the sweep by the base station.

14. A system in a cellular network, the system comprising:
- one or more detectors configured to obtain information indicating whether one or more terminals of the cellular network have data to transmit; and
- a base station configured to determine, during a sweep, if an upcoming terminal has data to transmit based on the information, wherein the sweep by the base station is a sequential movement of a beam of the base station over a coverage area, to forego any communication with the upcoming terminal during the sweep based on the information indicating that the upcoming terminal has no data to transmit, and to communicate with the upcoming terminal during the sweep based on the information indicating that the upcoming terminal has data to transmit.

15. The system according to claim 14, wherein the one or more detectors obtains the information from one or more types of indicators detected by the one or more detectors.

16. The system according to claim 15, wherein the one or more types of indicators include a visual indicator, an infrared signal, an ultraviolet signal, or an electromagnetic signal.

17. The system according to claim 16, wherein each terminal includes a corresponding indicator that is one of the one or more types of indicators.

18. The system according to claim 15, wherein the one or more detectors include a camera, an infrared detector, an ultraviolet detector, or a channel of the base station that is different than a channel used for communication with terminals.

19. The system according to claim 14, wherein the base station obtains the information during the sweep by the base station based on the one or more detectors performing a detector sweep such that the sweep by the base station being time-lagged from the detector sweep.

20. The system according to claim 14, wherein the base station obtains the information from the one or more detectors prior to initiating the sweep by the base station.

* * * * *